United States Patent
Fukuzono et al.

(10) Patent No.: US 11,677,597 B2
(45) Date of Patent: Jun. 13, 2023

(54) WIRELESS COMMUNICATION DEVICE, WIRELESS COMMUNICATION SYSTEM, AND WIRELESS COMMUNICATION METHOD

(71) Applicant: NIPPON TELEGRAPH AND TELEPHONE CORPORATION, Tokyo (JP)

(72) Inventors: Hayato Fukuzono, Musashino (JP); Keita Kuriyama, Musashino (JP); Tomohiro Tokuyasu, Musashino (JP); Tsutomu Tatsuta, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 25 days.

(21) Appl. No.: 17/595,055

(22) PCT Filed: May 21, 2019

(86) PCT No.: PCT/JP2019/020163
§ 371 (c)(1),
(2) Date: Nov. 8, 2021

(87) PCT Pub. No.: WO2020/235013
PCT Pub. Date: Nov. 26, 2020

(65) Prior Publication Data
US 2022/0200830 A1 Jun. 23, 2022

(51) Int. Cl.
*H04L 27/01* (2006.01)
(52) U.S. Cl.
CPC .................. *H04L 27/01* (2013.01)

(58) Field of Classification Search
CPC ....................................................... H04L 27/01
See application file for complete search history.

(56) References Cited

U.S. PATENT DOCUMENTS 7,418,035 B1 * 8/2008 Clark .................... H04L 25/022
375/233
2002/0159543 A1 10/2002 Perlow et al.
(Continued)

FOREIGN PATENT DOCUMENTS

JP 2018-148356 A 9/2018

OTHER PUBLICATIONS

Fukuzono, H. et al., "Bishohendo WO tomonau chochienha kankyo ni tekishita senkeitoukaki" (A Linear Equalizer for Large Channel Delay Spread Scenarios with Infinitesimal Changes), Tsushin kouen rombunshu 1 (Proceedings on Communications, Part I) of the 2017 IEICE General Conference, Mar. 2017, B-5-153.

*Primary Examiner* — Freshteh N Aghdam
(74) *Attorney, Agent, or Firm* — Harness, Dickey & Pierce, P.L.C.

(57) ABSTRACT

A wireless communication device includes an estimation observation unit that observes a channel condition by estimating a tendency of a long delay wave and a channel fluctuation from a received signal in which a training signal is added to a data frame, a first equalizer that compensates for the received signal, a second equalizer that compensates for the received signal with a property of having a higher long delay wave tolerance and a lower channel fluctuation tolerance than the first equalizer, and a control unit that performs control which switches such that the first equalizer or the second equalizer performs compensation for the received signal, on the basis of the channel condition observed by the estimation observation unit.

8 Claims, 11 Drawing Sheets

(56) References Cited

U.S. PATENT DOCUMENTS

| | | | | |
|---|---|---|---|---|
| 2009/0323796 | A1* | 12/2009 | Futatsugi | H04L 25/497 375/348 |
| 2012/0314750 | A1* | 12/2012 | Mehrabani | H04L 25/03159 375/229 |
| 2014/0023130 | A1* | 1/2014 | Mehrabani | H04L 25/03159 375/229 |
| 2015/0215139 | A1* | 7/2015 | Wan | H04L 25/03114 375/232 |
| 2015/0333781 | A1* | 11/2015 | Alon | H04W 88/02 370/310 |

* cited by examiner

|  | SECOND EQUALIZER 422 (DFE-IC) | FIRST EQUALIZER 421 (DFE) |
|---|---|---|
| LONG DELAY WAVE TOLERANCE | GOOD (EX. 20 SYMBOL LENGTHS, 20 FB TAPS) | POOR (EX. 10 SYMBOL LENGTHS, 10 FB TAPS) |
| CHANNEL FLUCTUATION TOLERANCE | POOR (MICROSCOPIC FLUCTUATION ONLY) | GOOD |

WIRELESS COMMUNICATION DEVICE, WIRELESS COMMUNICATION SYSTEM, AND WIRELESS COMMUNICATION METHOD

CROSS-REFERENCE TO RELATED APPLICATIONS

This application is a 371 U.S. National Phase of International Application No. PCT/JP2019/020163 filed on May 21, 2019. The entire disclosure of the above application is incorporated herein by reference.

TECHNICAL FIELD

The present invention relates to a wireless communication device, a wireless communication system, and a wireless communication method.

BACKGROUND ART

In wireless communication, communication quality degraded by, e.g., intersymbol interference due to multipath is compensated for by an equalizer.

Figure 13:
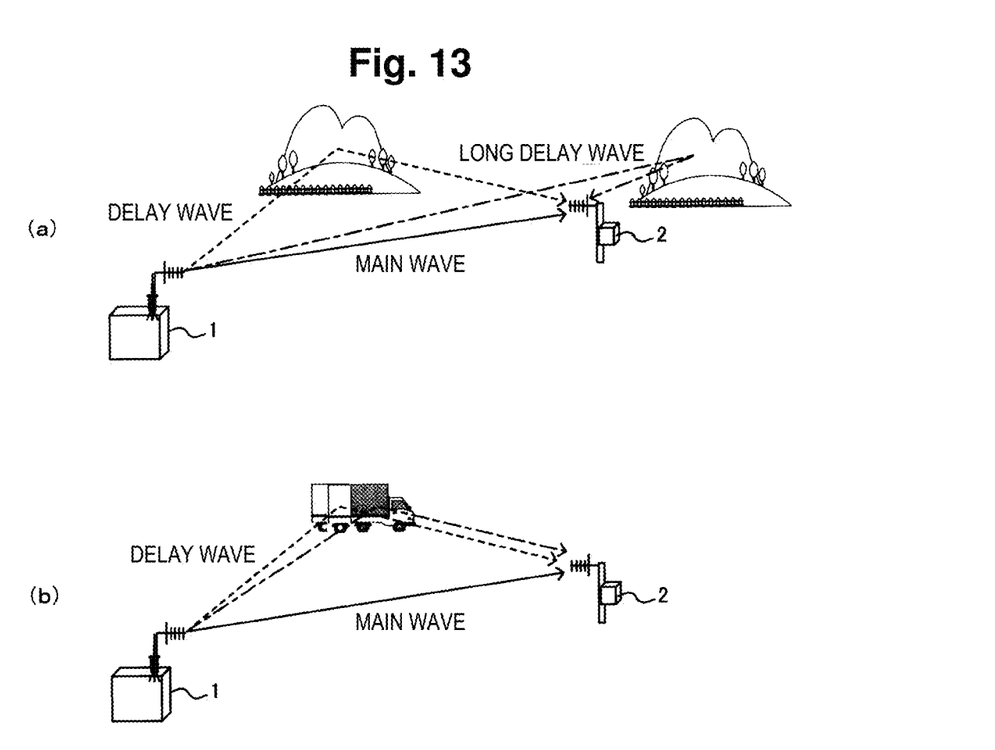
FIG. 13(a) is a diagram showing multipath in wireless communication in a rural area, such as a mountain area.
FIG. 13(b) is a diagram showing multipath in wireless communication in a case where a reflector, such as a vehicle, moves.

FIG. 13 are views showing examples of a relationship between an environment where wireless communication is performed and multipath. FIG. 13(a) is a view showing multipath in wireless communication in a rural area, such as a mountain area. FIG. 13(b) is a view showing multipath in wireless communication in a case where a reflector, such as a vehicle, moves.

As shown in FIG. 13(a), if mountains present at a great distance serve as a reflector, when a signal is transmitted from a transmitter 1 to a receiver 2, a delay wave (reflected wave) and a long delay wave with a longer delay time period are present together with a main wave. As shown in FIG. 13(b), if a reflector moves, when a signal is transmitted from the transmitter 1 to the receiver 2, a response of a reflected wave may fluctuate.

Figure 14:
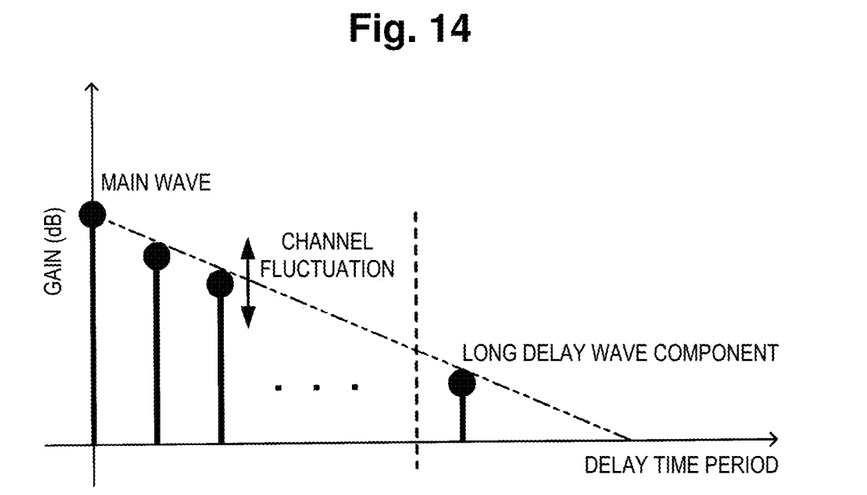
FIG. 14 is a chart illustrating by example a channel impulse response of a received wave representing a channel condition.

FIG. 14 is a chart illustrating by example a CIR (Channel Impulse Response) of a received wave which represents a channel condition. As shown in FIG. 14, for example, if multipath is present, a long delay wave component which is smaller in gain than a main wave and is received after a time period longer than a predetermined delay time period may be produced. A fluctuation in channel appears as a change in gain.

The linear equalizer disclosed in Non-Patent Literature 1 is suitable for, for example, an environment where a long delay wave with a microscopic fluctuation is produced.

CITATION LIST

Non-Patent Literature

Non-Patent Literature 1: Fukuzono, H. and three others, "Bishohendo wo tomonau chochienha kankyo ni tekishita senkeitoukaki" (A Linear Equalizer for Large Channel Delay Spread Scenarios with Infinitesimal Changes), Tsushin kouen rombunshu 1 (Proceedings on Communications, Part I) of the 2017 IEICE General Conference, March 2017, B-5-153

SUMMARY OF THE INVENTION

Technical Problem

Generally, an equalizer continues to be used in an initialized state. Equalizers vary in tolerance depending on type. If an equalizer continues to be used in an initialized state, the equalizer may fail to effectively compensate for a signal depending on an environment or a channel condition.

It is an object of the present invention to provide a wireless communication device, a wireless communication system, and a wireless communication method capable of effectively compensating for a signal in accordance with an environment or a channel condition.

Means for Solving the Problem

A wireless communication device according to one aspect of the present invention includes an estimation observation unit that observes a channel condition by estimating a tendency of a long delay wave and a channel fluctuation from a received signal in which a training signal is added to a data frame, a first equalizer that compensates for the received signal, a second equalizer that compensates for the received signal with a property of having a higher long delay wave tolerance and a lower channel fluctuation tolerance than the first equalizer, and a control unit that performs control which switches such that the first equalizer or the second equalizer performs compensation for the received signal, on the basis of the channel condition observed by the estimation observation unit.

A wireless communication system according to one aspect of the present invention is a wireless communication system including a transmitter that transmits a transmitted signal in which a training signal is added to a data frame and a receiver that receives, as a received signal, the transmitted signal, wherein the receiver includes an estimation observation unit that observes a channel condition by estimating a tendency of a long delay wave and a channel fluctuation from the received signal, a first equalizer that compensates for the received signal, a second equalizer that compensates for the received signal with a property of having a higher long delay wave tolerance and a lower channel fluctuation tolerance than the first equalizer, and a control unit that performs control which switches such that the first equalizer or the second equalizer performs compensation for the received signal, on the basis of the channel condition observed by the estimation observation unit.

A wireless communication method according to one aspect of the present invention includes an estimation observation step of observing a channel condition by estimating a tendency of a long delay wave and a channel fluctuation from a received signal in which a training signal is added to a data frame, a first compensation step of compensating for the received signal, a second compensation step of compensating for the received signal with a property of having a higher long delay wave tolerance and a lower channel fluctuation tolerance than the first compensation step, and a control step of switching such that compensation for the received signal is performed by the first compensation step or the second compensation step, on the basis of the channel condition observed by the estimation observation step.

Effects of the Invention

According to the present invention, it is possible to effectively compensate for a signal in accordance with an environment or a channel condition.

DESCRIPTION OF EMBODIMENTS

Figure 1:
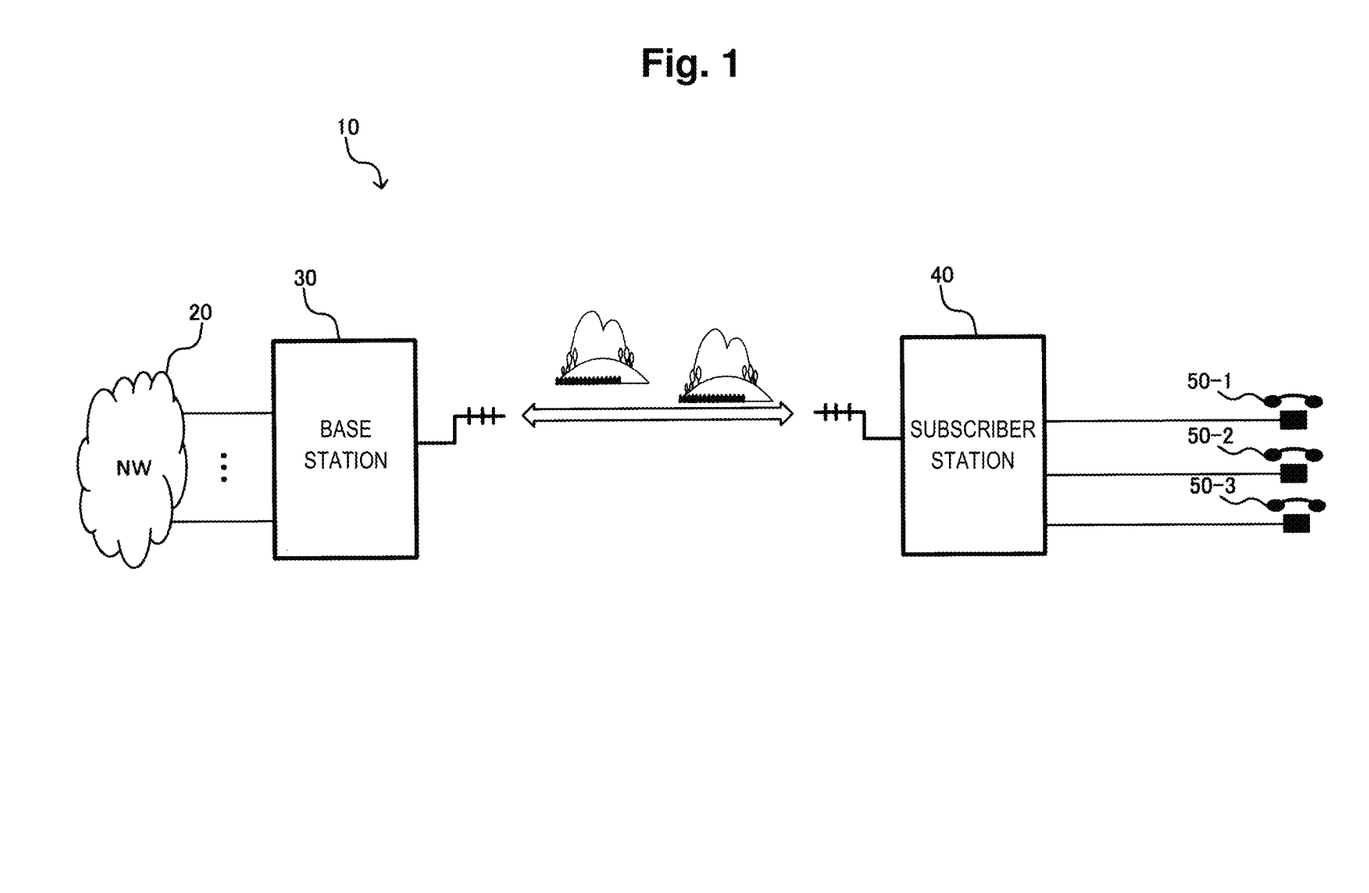
FIG. 1 is a diagram showing an example of a configuration of a wireless communication system according to an embodiment.

An embodiment of a wireless communication system will be described below with reference to the drawings. FIG. 1 is a diagram showing an example of a configuration of a wireless communication system 10 according to the embodiment. As shown in FIG. 1, the wireless communication system 10 is, for example, a subscriber-based wireless system having a base station 30 which is connected to a network 20 and a subscriber station 40 which performs wireless communication with the base station 30.

The base station 30 and the subscriber station 40 are wireless communication devices which are arranged in a rural area, such as a mountain area. For example, telephone terminals 50-1 to 50-3 are connected to the subscriber station 40. In the rural area, the wireless communication system 10 is such that a non-communication period occurs relatively frequently and lasts for a long time period and such that a radio channel is relatively stable.

Figure 2:
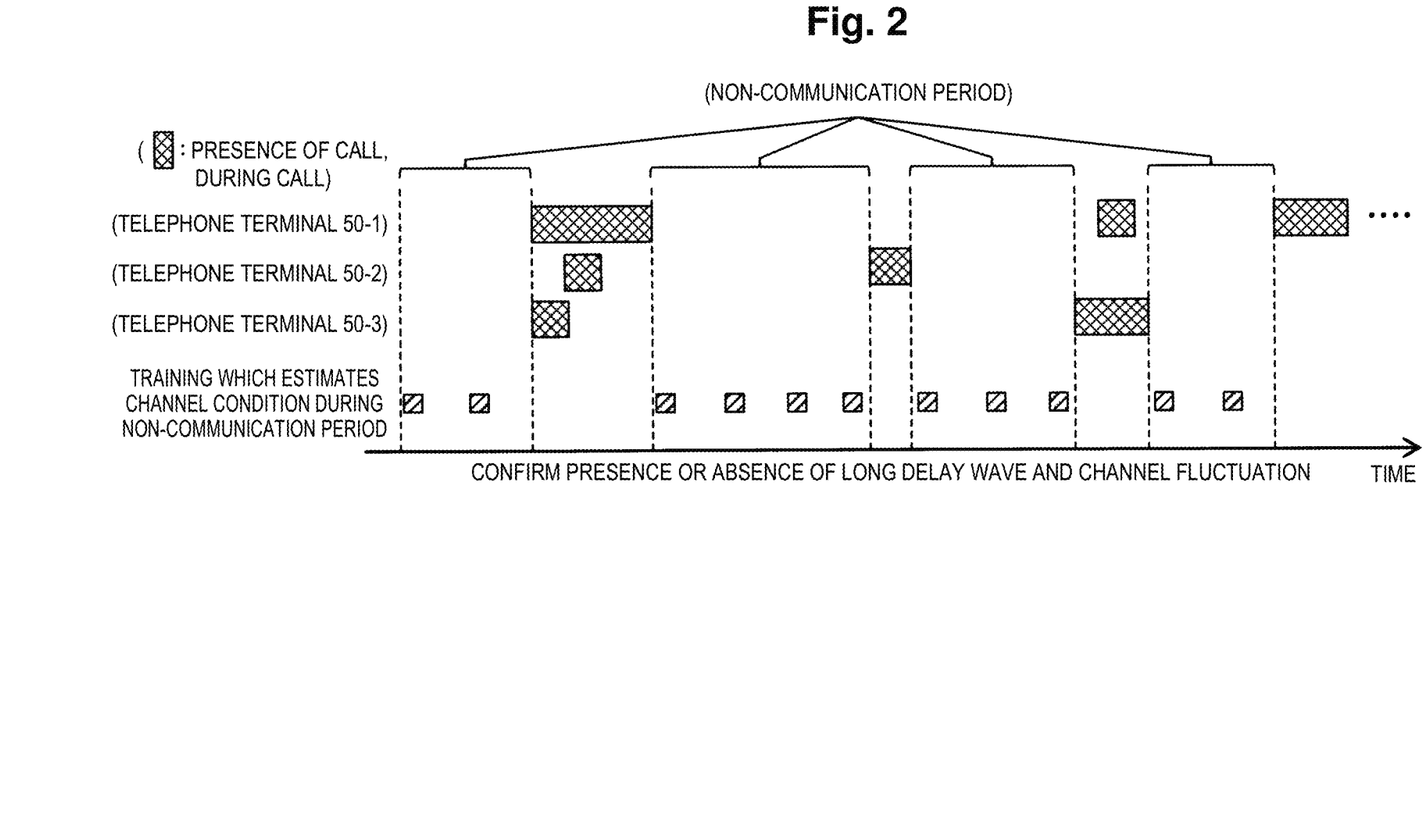
FIG. 2 is a chart showing a specific example of communication in the wireless communication system in a rural area.

FIG. 2 is a chart showing a specific example of communication in the wireless communication system 10 in the rural area. As shown in FIG. 2, in the wireless communication system 10, a non-communication period, for example, when none of the telephone terminals 50-1 to 50-3 is in the middle of a call occurs relatively frequently and lasts for a long time period, and training which estimates a channel condition is performed in a non-communication period. For example, the wireless communication system 10 confirms the presence or absence of a long delay wave and the presence or absence of a channel fluctuation in a non-communication period.

Figure 3:
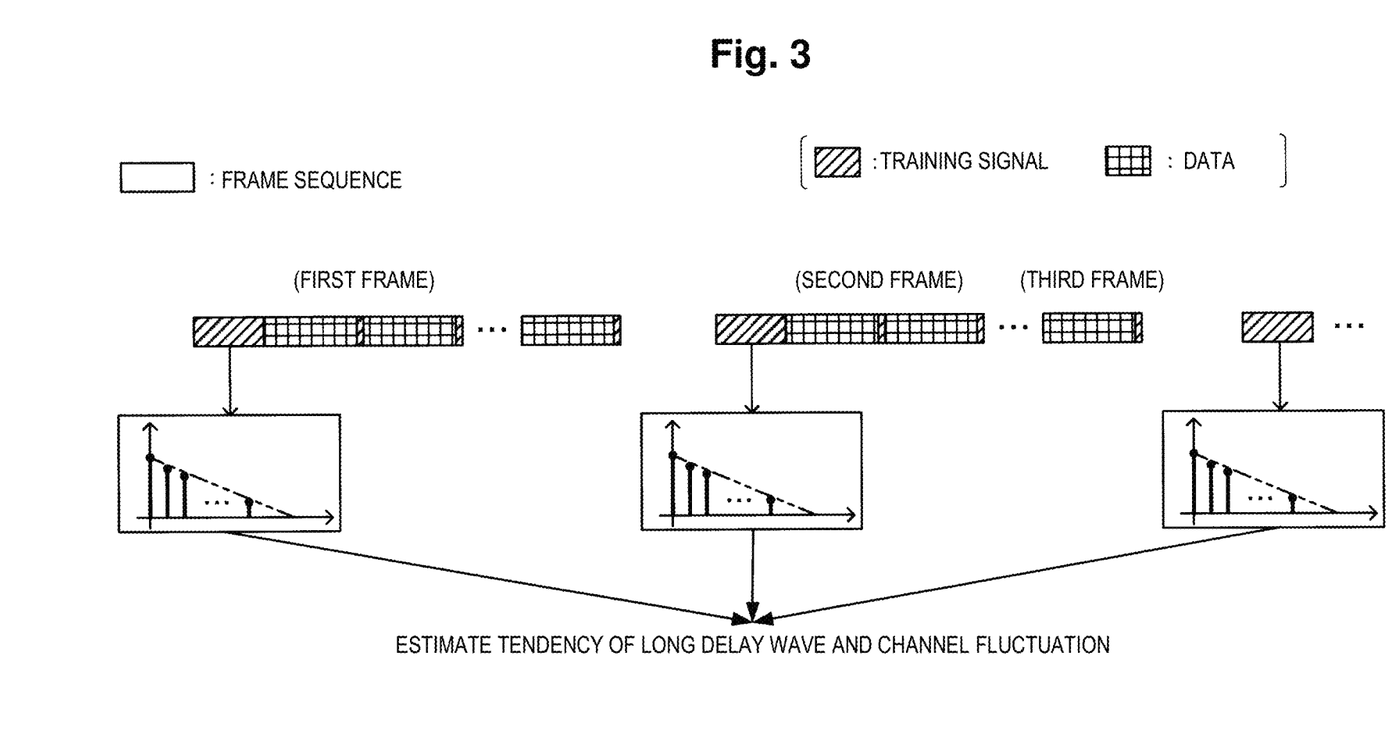
FIG. 3 is a chart showing examples of a communication frame which is transmitted from a base station and is received by a subscriber station.

FIG. 3 is a chart showing examples of a communication frame which is transmitted from the base station 30 and is received by the subscriber station 40. The subscriber station 40 receives a plurality of communication frames (a first frame, a second frame, a third frame, . . . ) which are transmitted from the base station 30. Each of the communication frames includes training signals (training sections) together with data. A training signal is, for example, included at the head of the frame and between slots.

The wireless communication system 10 estimates a tendency of a long delay wave and a channel fluctuation and observes a channel condition within each of a plurality of training sections in each communication frame. Assuming that the base station 30 is a transmitter and that the subscriber station 40 is a receiver, a case where a signal transmitted by the base station 30 is received by the subscriber station 40 will be described as an example.

Figure 4:
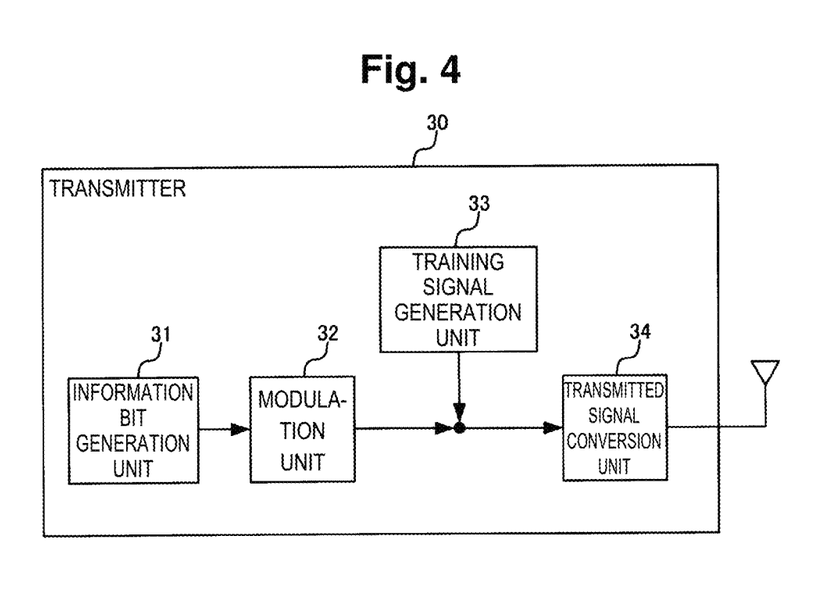
FIG. 4 is a diagram showing an example of a configuration of a base station according to the embodiment.

FIG. 4 is a diagram showing an example of a configuration of the base station 30. As shown in FIG. 4, the base station 30 has an information bit generation unit 31, a modulation unit 32, a training signal generation unit 33, and a transmitted signal conversion unit 34.

The information bit generation unit 31 generates data (information bits) to be transmitted and outputs the data to the modulation unit 32. The modulation unit 32 modulates the data input from the information bit generation unit 31 in accordance with settings and outputs the data.

The training signal generation unit 33 generates training signals, adds the training signals to the modulated data (a data frame) output by the modulation unit 32 to form a transmitted signal, and outputs the transmitted signal to the transmitted signal conversion unit 34. The transmitted signal conversion unit 34 converts the transmitted signal into an RF signal (a high-frequency signal) and transmits the transmitted signal to the subscriber station 40 via an antenna.

Note that the wireless communication system 10 may be provided with a function of optimizing the length of a training signal within a communication frame to be transmitted by the base station 30.

Figure 5:
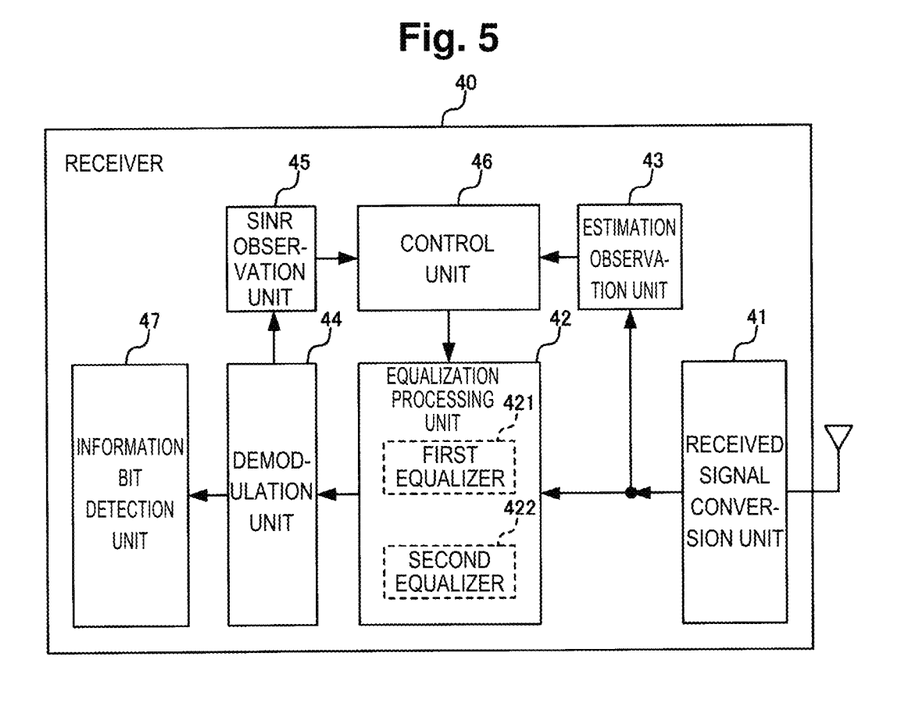
FIG. 5 is a diagram showing an example of a configuration of a subscriber station according to the embodiment.

FIG. 5 is a diagram showing an example of a configuration of the subscriber station 40. As shown in FIG. 5, the subscriber station 40 has a received signal conversion unit 41, an equalization processing unit 42, an estimation observation unit 43, a demodulation unit 44, an SINR observation unit 45, a control unit 46, and an information bit detection unit 47.

The received signal conversion unit 41 converts a received signal which is received via an antenna from a high-frequency signal into a baseband signal and outputs the received signal after the conversion to the equalization processing unit 42 and the estimation observation unit 43.

Figure 6:
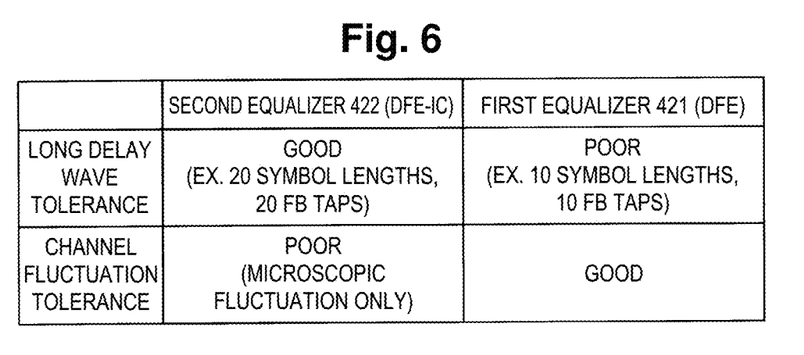
FIG. 6 is a chart showing a difference in tolerance between a first equalizer and a second equalizer.

The equalization processing unit 42 has a first equalizer 421 and a second equalizer 422. FIG. 6 is a chart showing a difference in tolerance between the first equalizer 421 and the second equalizer 422.

The first equalizer 421 is, for example, a DFE (Decision Feedback Equalizer) which is tolerant of a delay wave with 10 symbol lengths, and is set to have 10 feedback (FB) taps to compensate for a received signal.

The second equalizer 422 is an equalizer which compensates for a received signal with a property of having a higher long delay wave tolerance and a lower channel fluctuation tolerance (supporting only a microscopic fluctuation) than the first equalizer 421. The second equalizer 422 is, for example, a DFE which is tolerant of a long delay wave with, e.g., 20 symbol lengths, and is set to have 20 feedback taps to compensate for a received signal. Specifically, the second equalizer 422 corresponds to, e.g., "the linear equalizer (DFE-IC) suitable for a long delay wave environment with a microscopic fluctuation" disclosed in Non-Patent Literature 1.

The equalization processing unit 42 compensates for the received signal input from the received signal conversion unit 41 with the first equalizer 421 or the second equalizer 422 under control of the control unit 46 and outputs the compensated-for received signal to the demodulation unit 44.

Note that the equalization processing unit 42 may be configured to optimize compensation without switching between the first equalizer 421 and the second equalizer 422, or with switching of tap coefficients together with switching between the first equalizer 421 and the second equalizer 422.

The estimation observation unit 43 (FIG. 5) observes the channel condition by estimating a tendency of a long delay wave and a channel fluctuation from the received signal, in which training signals are added to a data frame, and outputs the observed channel condition (a channel environment) to the control unit 46.

For example, the estimation observation unit 43 estimates a tendency of a long delay wave and a channel fluctuation by determining, through CIR estimation, the presence or absence of a long delay wave component of a training signal which exceeds a predetermined delay time period during non-communication and the presence or absence of a plurality of training signals which exceed a predetermined fluctuation during non-communication. Specifically, operation of the estimation observation unit 43 will be described with reference to FIGS. 7 and 8.

Figure 7:
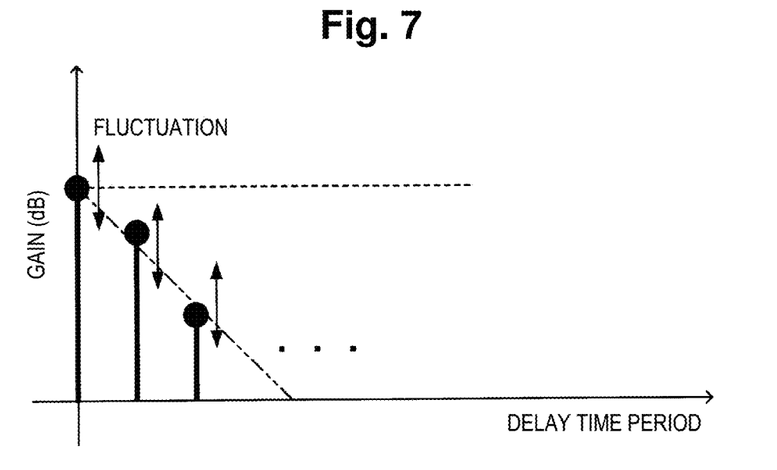
FIG. 7 is a chart showing a first example of a CIR which is estimated, by an estimation observation unit, from a received wave representing a channel condition of the wireless communication system.

FIG. 7 is a chart showing a first example of a CIR which is estimated, by the estimation observation unit 43, from a received wave representing the channel condition of the wireless communication system 10. The estimation observation unit 43 estimates a CIR and determines whether fluctuations in a plurality of training signals (hereinafter referred to as N training frames) exceed a predetermined threshold (or are not more than the threshold).

For example, the estimation observation unit 43 compares, for example the sum of variances of fluctuations in multipath delay waves with a gain of a main wave. If the sum of the variances of the fluctuations is not more than −20 dB with respect to the gain of the main wave, the estimation observation unit 43 determines that a current environment is an environment with a large channel fluctuation and outputs a determination result as the channel condition to the control unit 46.

Figure 8:
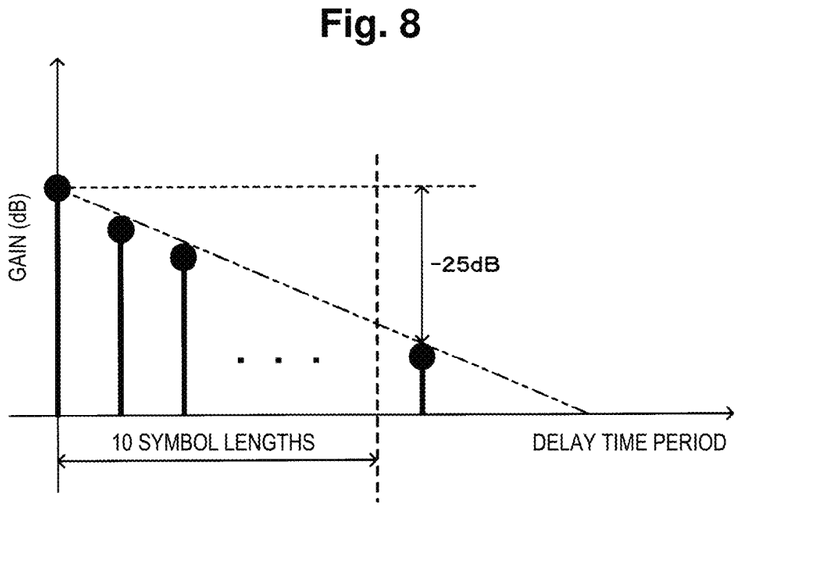
FIG. 8 is a chart showing a second example of a CIR which is estimated, by the estimation observation unit, from a received wave representing the channel condition of the wireless communication system.

FIG. 8 is a chart showing a second example of a CIR which is estimated, by the estimation observation unit 43, from a received wave representing the channel condition of the wireless communication system 10. The estimation observation unit 43 estimates a CIR and determines whether a delay time period and a gain exceed respective predetermined thresholds (or are not more than the thresholds).

For example, if there is a delay wave whose delay time period is not less than 10 symbol lengths and which is not less than −25 dB, the estimation observation unit 43 determines that the current environment is a long delay wave environment and outputs a determination result as the channel condition to the control unit 46.

The demodulation unit 44 (FIG. 5) demodulates the received signal compensated with the first equalizer 421 or the second equalizer 422 by the equalization processing unit 42 and outputs the received signal to the SINR observation unit 45 and the information bit detection unit 47.

The SINR observation unit 45 observes an SINR (Signal-to-Interference plus Noise power Ratio) of the received signal demodulated by the demodulation unit 44 and outputs a result of observing the SINR to the control unit 46.

The control unit 46 performs control which switches such that the first equalizer 421 or the second equalizer 422 performs compensation for a received signal on the basis of the channel condition input from the estimation observation unit 43 and the SINR observation result input from the SINR observation unit 45. That is, the control unit 46 determines whether switching between the first equalizer 421 and the second equalizer 422 is necessary and performs switching control.

For example, if the estimation observation unit 43 determines that a plurality of training signals which exceed the predetermined fluctuation are present, the control unit 46 performs control which switches such that the first equalizer 421 compensates for a received signal. Specifically, if it is determined by the estimation observation unit 43 that the current environment is an environment with a large channel fluctuation, as shown in FIG. 7, the control unit 46 performs control such that the equalization processing unit 42 compensates for a received signal with the first equalizer 421.

If it is determined by the estimation observation unit 43 that there is a long delay wave component of a training signal which exceeds the predetermined delay time period, the control unit 46 performs control which switches such that the second equalizer 422 compensates for a received signal. Specifically, if it is determined by the estimation observation unit 43 that the current environment is a long delay wave environment, as shown in FIG. 8, the control unit 46 performs control such that the equalization processing unit 42 compensates for a received signal with the second equalizer 422.

Additionally, the control unit 46 performs control so as not to switch from the first equalizer 421 or the second equalizer 422 to compensate for a received signal if a non-communication period is longer than a predetermined period and so as to reduce the frequency of switching between the first equalizer 421 and the second equalizer 422 if the non-communication period is shorter than the predetermined period. Here, the control unit 46, for example, increases a value of N described above in order to reduce the frequency of switching between the first equalizer 421 and the second equalizer 422. For example, the control unit 46 sets N to 5.

The control unit 46 may perform control so as not to switch the first equalizer 421 or the second equalizer 422 to compensate for a received signal if there are many non-communication periods and so as to reduce the frequency of switching between the first equalizer 421 and the second equalizer 422 if there are few non-communication periods.

The control unit 46 may perform control so as to switch from the first equalizer 421 or the second equalizer 422 to compensate for a received signal on the basis of a bit/packet error rate (BER/PER).

The information bit detection unit 47 detects data (information bits) from the received signal demodulated by the demodulation unit 44.

Figure 9:
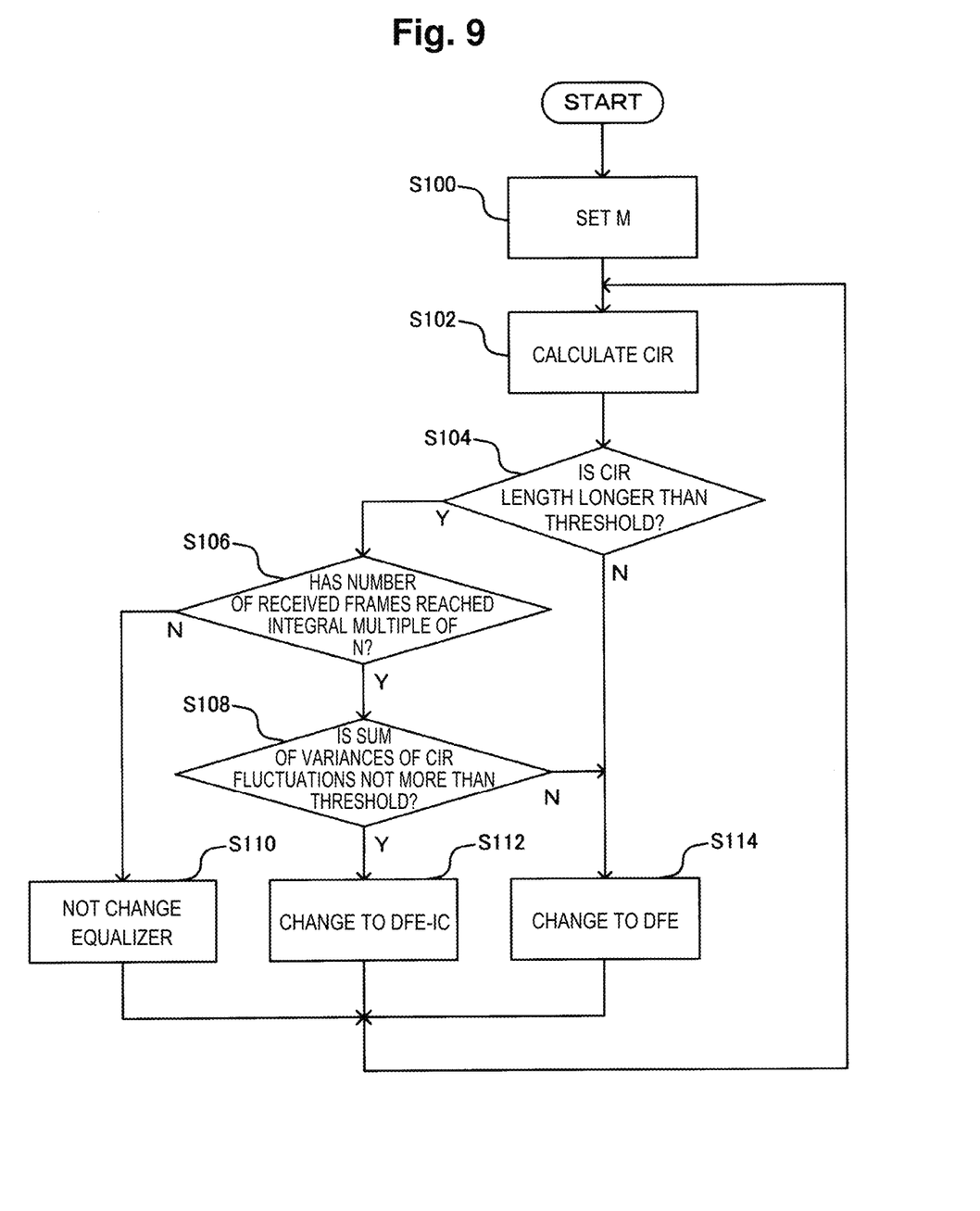
FIG. 9 is a flowchart showing a first operation example of the wireless communication system.

A first operation example of the wireless communication system 10 will be described. FIG. 9 is a flowchart showing the first operation example of the wireless communication system 10. First, the wireless communication system 10 sets the value of the number N of training frames on the basis of, for example, an average value for a non-communication period between the base station 30 and the subscriber station 40 (S100).

In the subscriber station 40, the estimation observation unit 43 calculates a CIR from a training frame of a received signal (S102). The estimation observation unit 43 determines whether a CIR length is longer than a threshold (S104). If the CIR length is longer than the threshold (YES in S102), the estimation observation unit 43 advances to a process in S106. If the CIR length is not more than the threshold (NO in S102), the estimation observation unit 43 advances to a process in S114.

The estimation observation unit 43 determines whether the number of received frames has reached a predetermined number (an integral multiple of N) (S106). If the number has reached the predetermined number (YES in S106), the estimation observation unit 43 advances to a process in S108. Otherwise (NO in S106), the estimation observation unit 43 advances to a process in S110.

The estimation observation unit 43 then determines whether the sum of variances of CIR fluctuations of most recent N frames is not more than a predetermined threshold (S108). If the sum of the variances is not more than the predetermined threshold (YES in S108), the estimation observation unit 43 advances to a process in S112. If the sum of the variances is more than the predetermined threshold (NO in S108), the estimation observation unit 43 advances to the process in S114.

The control unit 46 does not change an equalizer to compensate for a received signal in the equalization processing unit 42 (S110) and advances to a process in S102.

In the process in S112, the control unit 46 in the subscriber station 40 performs control which changes the equalizer to compensate for a received signal to the second equalizer 422 (DFE-IC). After that, the subscriber station 40 returns to the process in S102.

In the process in S114, the control unit 46 in the subscriber station 40 performs control which changes the equalizer to compensate for a received signal to the first equalizer 421 (DFE). After that, the subscriber station 40 returns to the process in S102.

A second operation example of the wireless communication system 10 will be described. In the second operation example, the wireless communication system 10 performs a combination of equalizer switching (equalizer operation) by the subscriber station 40 and adaptive modulation (adaptive modulation operation) by the base station 30.

Figure 10:
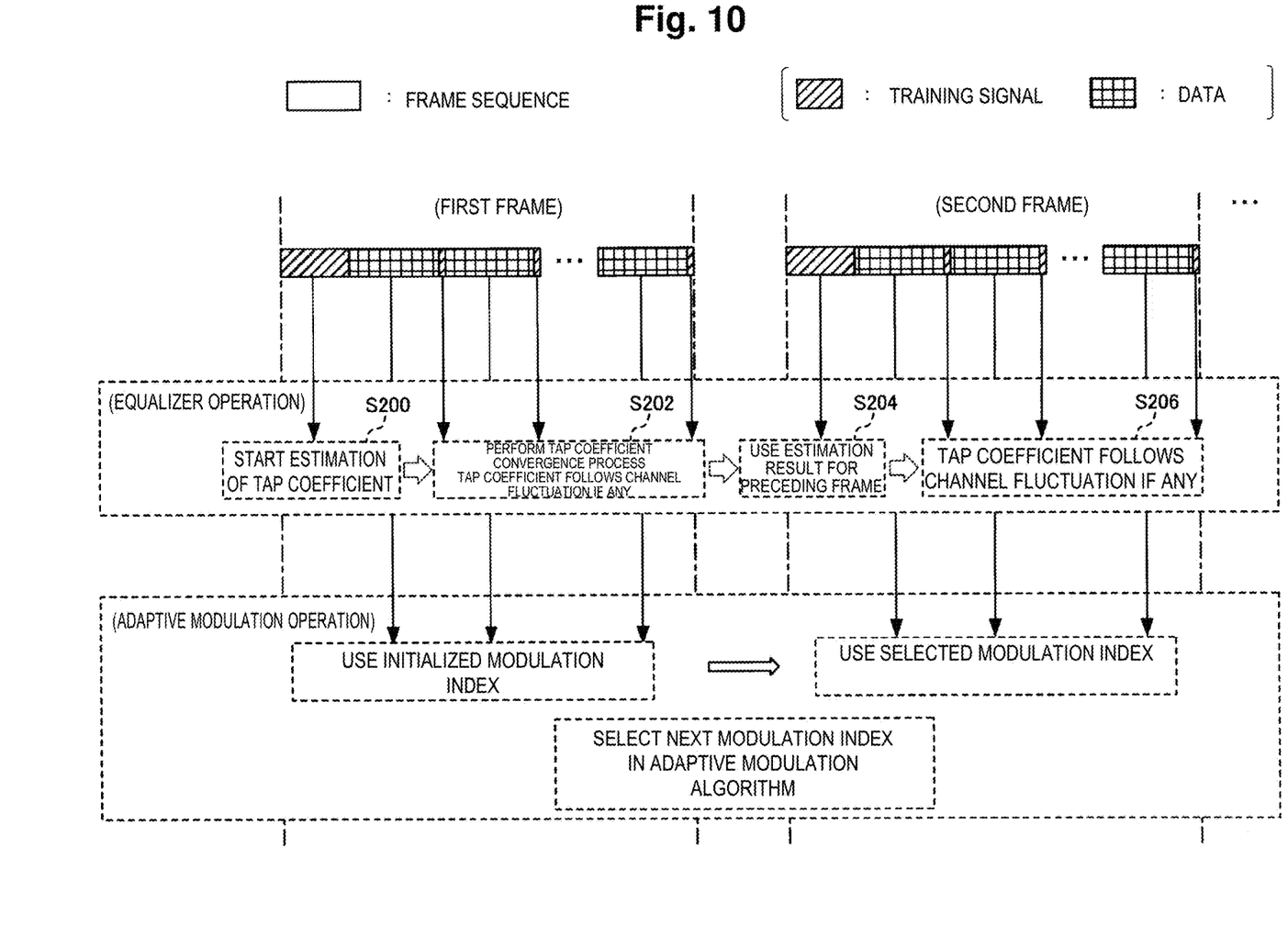
FIG. 10 is a chart showing an outline of a second operation example of the wireless communication system.

FIG. 10 is a chart showing an outline of the second operation example of the wireless communication system 10. As the equalizer operation, the subscriber station 40 first starts estimation for determining tap coefficients appropriate to the channel condition, using training signals at the frame head and between slots of a first frame and performs learning (S200).

The subscriber station 40 performs a process of converging the tap coefficients and causes the tap coefficients to follow a channel fluctuation if any (S202).

After that, the subscriber station 40 does not perform equalizer switching between frames for a second frame, and uses a result of estimating the tap coefficients for the preceding frame (the first frame) (S204) if an interval between the frames is short. That is, since the subscriber station 40 does not perform tap coefficient estimation for the second frame, a time period for converging the tap coefficients can be shortened.

Note that the subscriber station 40 also causes the tap coefficients to follow a channel fluctuation for the second frame if any (S206).

The base station 30 uses an initialized modulation index for data of the first frame. The initialized modulation index is, for example, 16-level 16QAM (Quadrature Amplitude Modulation).

As the adaptive modulation operation, the base station 30 selects a next modulation index in an adaptive modulation algorithm. Specifically, any one of 4-level QPSK (Quadrature Phase shift Keying), 16-level 16QAM, and 64-level 64QAM is selected in order to achieve desired communication quality, such as an SINR. A modulation index in the adaptive modulation algorithm is selected to cause an index drop if communication quality is poor.

For example, QPSK is used as a modulation index selected for data of the second frame.

Figure 11:
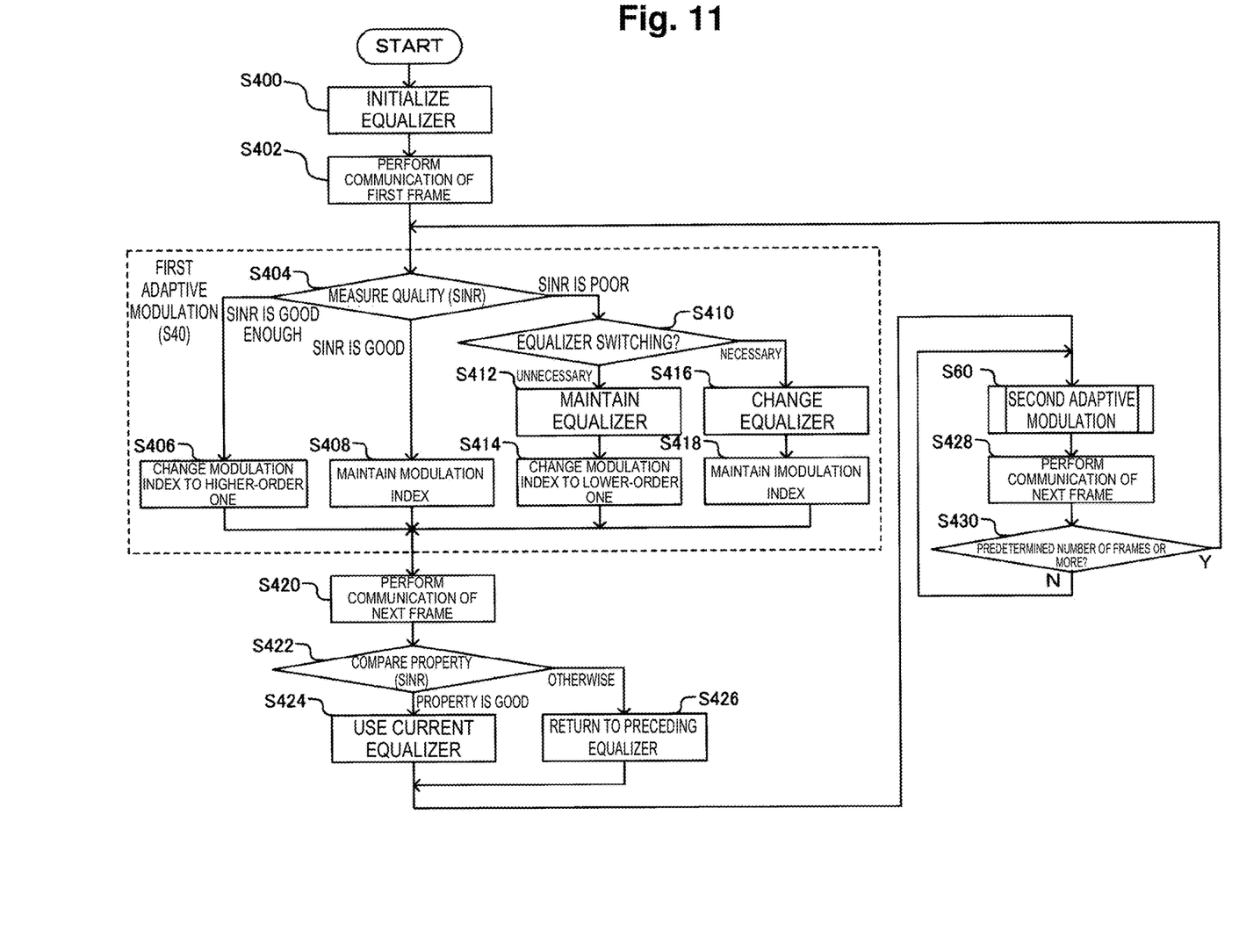
FIG. 11 is a flowchart showing the second operation example of the wireless communication system.

FIG. 11 is a flowchart showing the second operation example of the wireless communication system 10. As shown in FIG. 11, the second operation example of the wireless communication system 10 includes a first adaptive modulation process (S40) and a second adaptive modulation process (S60). For this reason, an operation example of the wireless communication system 10 including the second adaptive modulation process (S60) will be described first as a reference with reference to FIG. 12.

Figure 12:
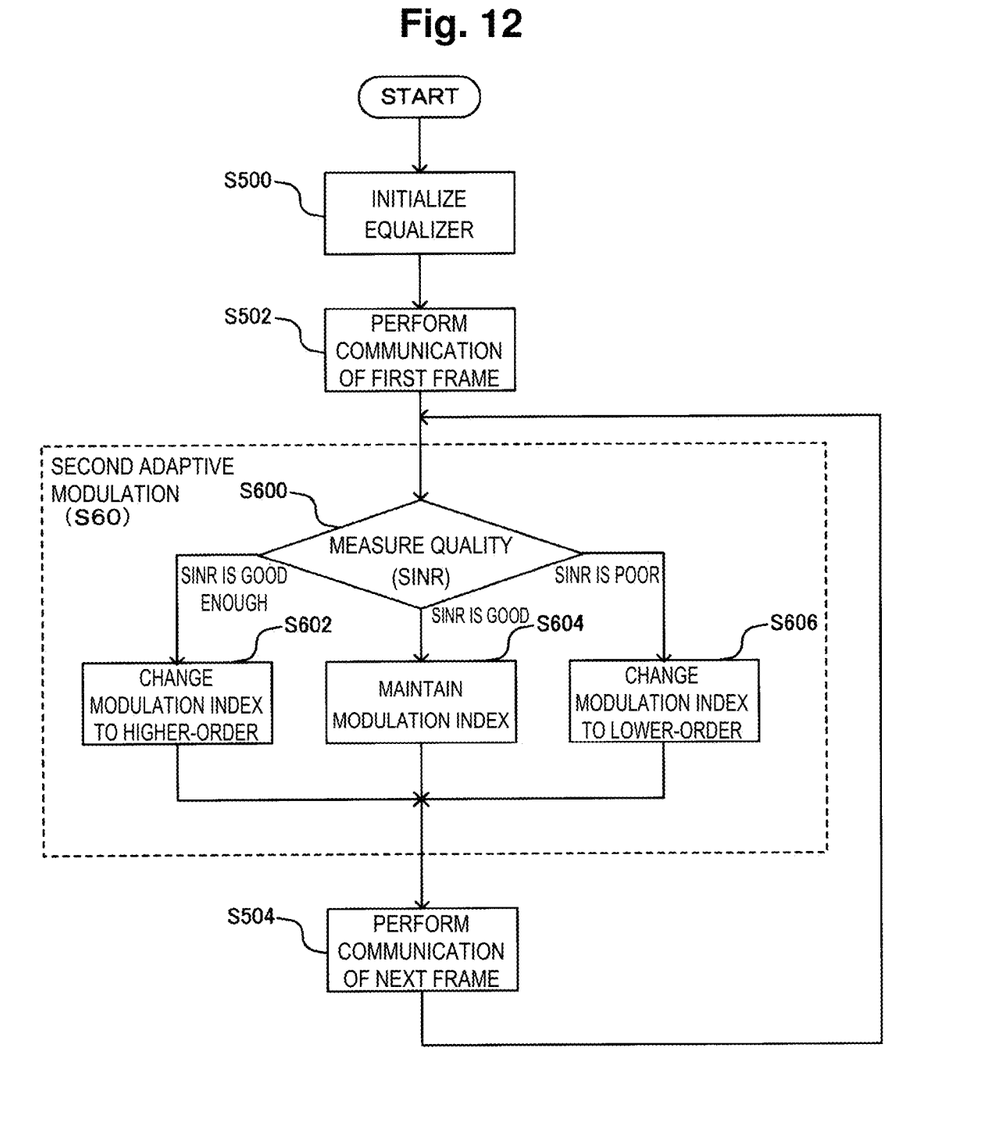
FIG. 12 is a flowchart showing an example of operation of the wireless communication system including a second adaptive modulation process.

FIG. 12 is a flowchart showing the operation example of the wireless communication system 10 including the second adaptive modulation process (S60). As shown in FIG. 12, the wireless communication system 10 first initializes an equalizer (S500). The wireless communication system 10 then performs communication of a first frame (S502).

After that, the wireless communication system 10 performs the second adaptive modulation process (S60). The wireless communication system 10 performs measurement of the communication quality on the basis of an SINR and the like (S600). The wireless communication system 10 changes a modulation index to a higher-order one (S602) if the SINR is good, and the quality is good enough. The wireless communication system 10 maintains the modulation index (S604) if the SINR is good, and the quality is normal. The wireless communication system 10 changes the modulation index to a lower-order one (S606) if the SINR is poor.

The wireless communication system 10 performs communication of a next frame (S504) and returns to the process in S60.

Referring back to FIG. 11, the second operation example of the wireless communication system 10 will be described.

In the second operation example of the wireless communication system 10, the wireless communication system 10 initializes an equalizer (S400). The wireless communication system 10 then performs communication of a first frame (S402).

After that, the wireless communication system 10 performs the first adaptive modulation process (S40). Here, the wireless communication system 10 performs measurement of the communication quality on the basis of an SINR and the like (S404). The wireless communication system 10 changes a modulation index to a higher-order one (S406) if the SINR is good, and the quality is good enough. The wireless communication system 10 maintains the modulation index (S408) if the SINR is good, and the quality is normal. The wireless communication system 10 advances to a process in S410 if the SINR is poor.

In the process in S410, the wireless communication system 10 determines whether switching between the first equalizer 421 and the second equalizer 422 is necessary (S410), as described above. If equalizer switching is determined to be unnecessary, the wireless communication system 10 maintains the equalizer (S412) and changes the modulation index to a lower-order one (S414). If equalizer switching is determined to be necessary, the wireless communication system 10 switches and changes from the equalizer to the other (S416) and maintains the modulation index (S418).

The wireless communication system 10 then performs communication of a next frame (S420) and advances to a process in S422.

The wireless communication system 10 compares a property, such as an SINR, in the current equalizer with a property, such as an SINR, in a preceding equalizer (S422). If the property as the SINR in the current equalizer is good, the wireless communication system 10 uses the current equalizer (S424). Otherwise, the wireless communication system 10 performs a process of switching so as to return to the preceding equalizer (S426).

The wireless communication system 10 then performs the second adaptive modulation process (S60) shown in FIG. 12 and then performs communication of a next frame (S428).

The wireless communication system 10 determines whether communication of a predetermined number (e.g., several tens) of frames or more has been performed in status quo (S430). If the communication has not been performed (NO in S430), the wireless communication system 10 returns to the process in S60. Otherwise (YES in S430), the wireless communication system 10 returns to the process in S40.

As described above, the wireless communication system 10 can effectively compensate for a signal in accordance with an environment or a channel condition by performing control which switches such that the first equalizer 421 or the second equalizer 422 performs compensation for a received signal. Since the wireless communication system 10 performs equalizer switching on the basis of the channel condition without unnecessary equalizer switching, a deterioration of a communication signal due to equalizer switching can be prevented. That is, the wireless communication system 10 can prevent a situation where frequent equalizer switching causes a deterioration in communication property without sufficient convergence of tap coefficients.

Note that the units constituting the base station 30 and the subscriber station 40 in the above-described embodiment may be partially or wholly implemented by hardware or implemented through execution of a program by a processor.

If the units constituting the base station 30 and the subscriber station 40 may be partially or wholly implemented through execution of a program by a processor, the program may be supplied recorded on a recording medium or supplied via a network.

REFERENCE SIGNS LIST

10 Wireless communication system
20 Network
30 Base station
31 Information bit generation unit
32 Modulation unit
33 Training signal generation unit
34 Transmitted signal conversion unit
40 Subscriber station
41 Received signal conversion unit
42 Equalization processing unit
43 Estimation observation unit
44 Demodulation unit
45 SINR observation unit
46 Control unit
47 Information bit detection unit
50-1 to 50-3 Telephone terminal
421 First equalizer
422 Second equalizer

The invention claimed is:

1. A wireless communication device comprising:
an estimation observation unit that observes a channel condition by estimating a tendency of a long delay wave and a channel fluctuation from a received signal in which a training signal is added to a data frame;
a first equalizer that compensates for the received signal;
a second equalizer that compensates for the received signal with a property of having a higher long delay wave tolerance and a lower channel fluctuation tolerance than the first equalizer; and
a control unit that performs control which switches such that the first equalizer or the second equalizer performs compensation for the received signal, on the basis of the channel condition observed by the estimation observation unit.

2. The wireless communication device according to claim 1, wherein the estimation observation unit
estimates the tendency of the long delay wave and the channel fluctuation by determining presence or absence of a long delay wave component of a training signal which exceeds a predetermined delay time period during non-communication and presence or absence of a plurality of training signals which exceed a predetermined fluctuation during non-communication, and
the control unit
performs control which switches such that the second equalizer compensates for the received signal if it is determined by the estimation observation unit that there is a long delay wave component of a training signal which exceeds the predetermined delay time period and switches such that the first equalizer compensates for the received signal if it is determined by the estimation observation unit that there are a plurality of training signals which exceed the predetermined fluctuation.

3. The wireless communication device according to claim 1, wherein
the control unit
performs control so as not to switch from the first equalizer or the second equalizer to compensate for the received signal if a non-communication period is longer than a predetermined period and so as to reduce frequency of switching between the first equalizer and the second equalizer if the non-communication period is shorter than the predetermined period.

4. The wireless communication device according to claim 1, further comprising
an Signal-to-Interference plus Noise power ratio (SINR) observation unit that observes an SINR of the received signal that is compensated for by the first equalizer or the second equalizer, wherein
the control unit
performs control which switches such that the first equalizer or the second equalizer performs compensation for the received signal in accordance with the SINR observed by the SINR observation unit.

5. A wireless communication system comprising a transmitter that transmits a transmitted signal in which a training signal is added to a data frame and a receiver that receives, as a received signal, the transmitted signal, wherein the receiver includes
an estimation observation unit that observes a channel condition by estimating a tendency of a long delay wave and a channel fluctuation from the received signal,
a first equalizer that compensates for the received signal,
a second equalizer that compensates for the received signal with a property of having a higher long delay wave tolerance and a lower channel fluctuation tolerance than the first equalizer, and
a control unit that performs control which switches such that the first equalizer or the second equalizer performs compensation for the received signal, on the basis of the channel condition observed by the estimation observation unit.

6. The wireless communication system according to claim 5, wherein the estimation observation unit
estimates the tendency of the long delay wave and the channel fluctuation by determining presence or absence of a long delay wave component of a training signal which exceeds a predetermined delay time period during non-communication and presence or absence of a plurality of training signals which exceed a predetermined fluctuation during non-communication, and
the control unit
performs control which switches such that the second equalizer compensates for the received signal if it is determined by the estimation observation unit that there is a long delay wave component of a training signal which exceeds the predetermined delay time period and switches such that the first equalizer compensates for the received signal if it is determined by the estimation observation unit that there are a plurality of training signals which exceed the predetermined fluctuation.

7. A wireless communication method comprising:
an estimation observation step of observing a channel condition by estimating a tendency of a long delay wave and a channel fluctuation from a received signal in which a training signal is added to a data frame;
a first compensation step of compensating for the received signal;
a second compensation step of compensating for the received signal with a property of having a higher long delay wave tolerance and a lower channel fluctuation tolerance than the first compensation step; and
a control step of switching such that compensation for the received signal is performed by the first compensation step or the second compensation step, on the basis of the channel condition observed by the estimation observation step.

8. The wireless communication method according to claim 7, wherein the estimation observation step comprises
estimating the tendency of the long delay wave and the channel fluctuation by determining presence or absence of a long delay wave component of a training signal which exceeds a predetermined delay time period during non-communication and presence or absence of a plurality of training signals which exceed a predetermined fluctuation during non-communication, and
the control step comprises
performing control which switches so as to compensate for the received signal by the second compensation step if it is determined by the estimation observation step that there is a long delay wave component of a training signal which exceeds the predetermined delay time period and switches so as to compensate for the received signal by the first compensation step if it is determined by the estimation observation step that there are a plurality of training signals which exceed the predetermined fluctuation.

* * * * *